United States Patent [19]

Jones, Jr. et al.

[11] Patent Number: 4,544,867

[45] Date of Patent: Oct. 1, 1985

[54] VIBRATOR FOR FURNITURE

[76] Inventors: John O. Jones, Jr., 1 Cross Creek, Irvine, Calif. 92714; Charles White, Jr., 8901 Crescent Dr., Huntington Beach, Calif. 92646

[21] Appl. No.: 481,659

[22] Filed: Apr. 4, 1983

[51] Int. Cl.4 .............................. H02K 33/00
[52] U.S. Cl. .................. 318/129; 318/130; 318/132; 128/33
[58] Field of Search ............... 318/122, 123, 127–132; 128/32, 33

[56] References Cited

U.S. PATENT DOCUMENTS

| | | | |
|---|---|---|---|
| 3,400,316 | 9/1968 | Kuschel | 318/129 X |
| 3,454,957 | 7/1969 | Chaplenko | 318/122 |
| 3,474,314 | 10/1969 | Ito | 318/132 |
| 3,649,893 | 3/1972 | Lajoie | 318/132 X |
| 3,798,521 | 3/1974 | Berney | 318/132 X |
| 3,806,781 | 4/1974 | Berney | 318/130 |
| 4,370,602 | 1/1983 | Jones, Jr. et al. | 318/130 X |
| 4,371,815 | 2/1983 | Jones, Jr. et al. | 318/130 X |
| 4,401,925 | 8/1983 | Brander | 318/129 X |

Primary Examiner—Donovan F. Duggan
Attorney, Agent, or Firm—Larson and Taylor

[57] ABSTRACT

A vibrator control circuit is provided for controlling the driving current supplied to the driving coil of an electromagnetic vibrator for a bed or the like. The control circuit is adapted to be connected to source of A.C. line voltage such as a standard wall outlet and controls the duration of the portion of each cycle of the A.C. line voltage supplied to the vibrator. The control circuit includes an electronic switch, e.g., a transistor, connected in series with the driving coil of the vibrator and a control pulse generator for supplying control pulses to the electronic switch to control switching of the electronic switch in timed relationship with respect to the A.C. line voltage waveform so as to gradually vary the duration of the portion of the A.C. line voltage supplied to the electromagnetic vibrator during each cycle of the A.C. line voltage.

17 Claims, 5 Drawing Figures

VIBRATOR FOR FURNITURE

FIELD OF THE INVENTION

The present invention relates to vibrator systems for producing vibrations in articles of furniture such as beds or in other body support structures.

BACKGROUND OF THE INVENTION

A number of techniques and device have been used for the vibration of articles of furniture such as beds and chairs so as to provide gentle massaging of the user. Because of the ready availability of 60-cycle current from an ordinary wall outlet, many prior art systems have used either a direct 60-cycle transducer to produce vibrations or a motor, with an eccentric weight, driven from the 60-cycle current. Other more recent and more sophisticated approaches have provided considerably more flexibility and variety in the vibrations produced, these systems enabling relatively wide variations in both the frequency and intensity of the vibrations. However, these systems tend to be relatively complex.

SUMMARY OF THE INVENTION

In accordance with the present invention, a vibration producing system is provided which is extremely simple yet efficient and flexible, and which produces highly effective, readily controllable vibration patterns.

According to the invention, a control vibrator system is provided for controlling the driving current supplied to the driving coil of electro-mechanical vibrator for producing vibrations in an article of furniture or the like wherein the control circuit comprises means, e.g., a wall plug, connected to the vibrator and adapted to be connected to source of A.C. line voltage such as a standard wall outlet; and control means for controlling the duration of the portion of each cycle of the A.C. line voltage that is supplied to the electromagnetic vibrator. The control means comprises an electronic switch, such as a transistor or thyristor, connected in series with the driving coil of the vibrator, and a control pulse generating means for supplying control pulses to the electronic switch to control switching of the electronic switch in timed relationship with respect to the A.C. line voltage waveform so as to vary the duration of the portion of the A.C. line voltage supplied to the vibrator during each cycle of the A.C. line voltage. By variably controlling the time which the electronic switch assumes the "on" state thereof relative to the A.C. voltage waveform, a graduation variation can be provided in the duration of the portion of the A.C. line voltage supplied to the vibrator during each cycle over a given time period. This duration ranges from a predetermined maximum to a predetermined minimum (which may be zero).

In accordance with a preferred embodiment thereof, the invention further comprises rectifier means for half-wave rectifying said A.C. line voltage, the control means thus acting to control the duration of the portion of each voltage half-wave supplied to the vibrator. Advantageously, the control pulse generator means comprises a signal generator for generating a train of constant duration pulses having a frequency which differs from the frequency of the line voltage such that switching of the electronic switch over a predetermined period occurs at a point in the A.C. half-wave which gradually varies in the same direction over the period so as to produce a corresponding gradual variation in the duration of the portion of the A.C. half-wave supplied to the vibrator. The duration of the control pulses can be such as to completely block some of the voltage half-waves during the predetermined period. Preferably, the duration of the individual pulses and period of the pulse train are both variable. A timer may be provided for controlling enabling and disabling of the signal generator.

Other features and advantages of the present invention will be set forth in, or apparent from, the detailed description of the preferred embodiment of the invention found hereinbelow.

DESCRIPTION OF A PREFERRED EMBODIMENT

Figure 1:
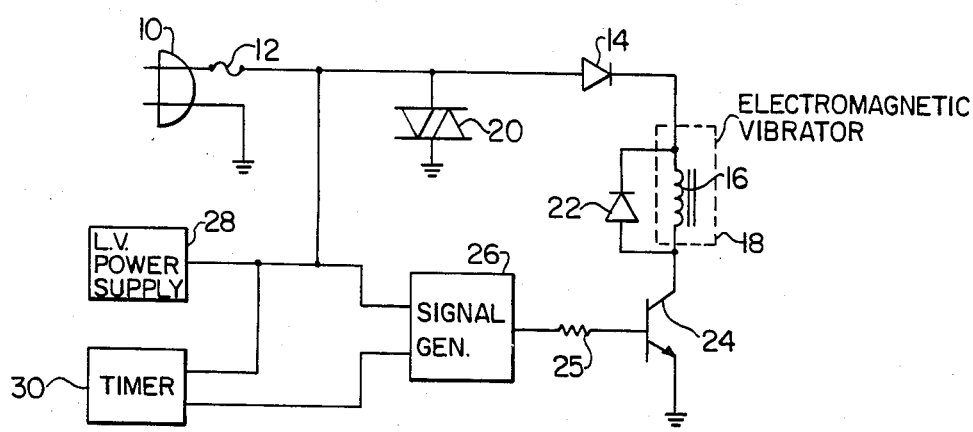
FIG. 1 is a schematic circuit diagram of a vibrator control system constructed in accordance with a presently preferred embodiment of the invention.
Figure 2A:
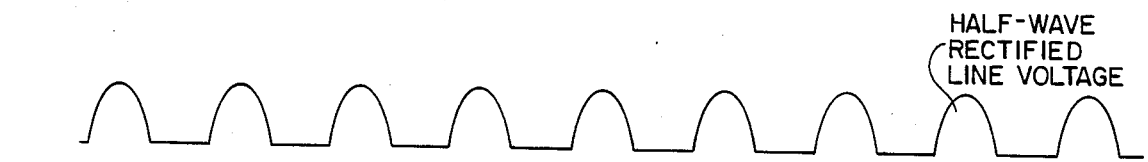
FIGS. 2(a) to 2(c) are voltage waveforms illustrating the operation of the system of FIG. 1.

Referring to FIG. 1, a schematic circuit diagram is shown of a preferred embodiment of the vibrator control circuit of the invention. The circuit includes a standard wall plug 10 connected through a fuse 12 and a rectifier diode 14 to the driving coil 16 of an electromagnetic vibrator 18. A varistor 20 is connected in shunt with the line connection to vibrator 18 to provide over-voltage protection while a further diode 22 is connected in shunt across coil 16 of vibrator 18. Diode 14 provides half-wave rectification of the 60 Hz line voltage as indicated in FIG. 2(a). The collector-emitter circuit of a transistor 24, which operates as an electronic switch, is connected in series with coil 16 of vibrator 18 between the coil and ground. The base of transistor 24 is connected through a resistor 25 to a variable "on" time, variable period signal generator 26 which preferably produces a square wave pulse train of the general form indicated in FIG. 2(b). A low voltage power supply 28 is connected to signal generator 26 and to a solid state timer circuit 30 which controls enabling and disabling of signal generator 26 to thereby control the time period of the massaging action provided by vibrator 18.

Figure 3:
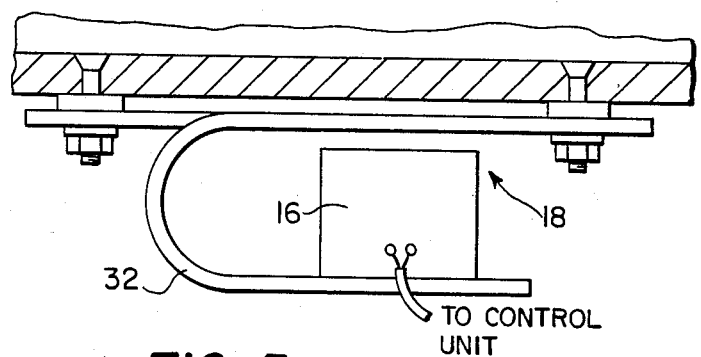
FIG. 3 is a detail, in elevation and partially broken away, of an exemplary mounting arrangement for the vibrator of FIG. 1.

Vibrator 18 can be mounted in any suitable manner on a piece of furniture, such as a bed, or other support structure for the body. For example, the mounting arrangement can be of the general type shown in FIG. 3 and disclosed in more detail in our copending applications Ser. Nos. 135,297 and 136,176 both filed Mar. 31, 1980, which are divisionals of Ser. No. 800,588, filed May 25, 1977, now abandoned. The mounting arrangement shown in FIG. 3 includes a U-shaped spring steel band 32 having one flat side which is connected by suitable screw and washer assemblies 34 to the deck 36 of a bed or the like, which supports a mattress 38. The other flat side of band 32 serves to mount coil 16 which is indicated in block form in FIG. 3. When cyclical current is supplied to coil 18 from the control circuit of FIG. 1, vibrations will be produced which will be induced into deck 36 and in the mattress 38 above the deck, as is described in the applications referred to above.

Considering the operation of the vibrator control system of the invention, transistor 24 is switched on and switched off under the control of signal generator 26 to control the half-wave rectified voltage supplied to vibrator coil 16. Switching of transistor 24 is controlled by the pulse train shown in FIG. 2(b) and as shown at the left-hand portion of FIGS. 2(a), 2(b) and 2(c), when the pulse from signal generator 26 (FIG. 2(b)) is coincident in time with the line voltage half-wave shown in FIG. 2(a), transistor 24 will be switched "on" for the full duration of the line voltage half-wave and the voltage supplied to the vibrator will be the complete half-wave as shown in FIG. 2(c).

Figure 2B:
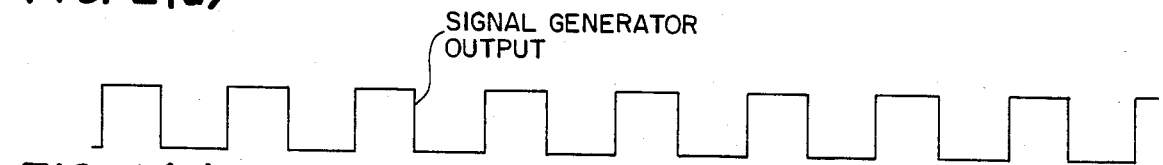
Figure 2C:
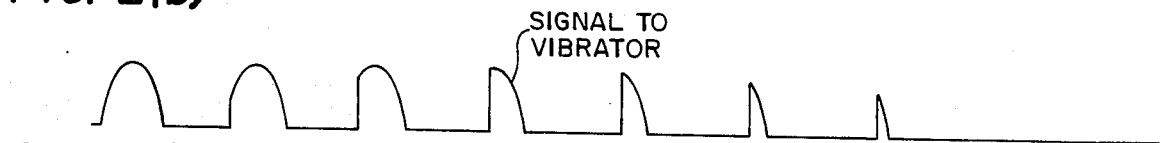

The frequency of the pulses produced by signal generator 26 is different from that of the 60 Hz half-wave line voltage and thus the relative positions in time between the two will gradually shift as indicated in FIGS. 2(a) and 2(b). Thus, in the specific exemplary embodiment illustrated, the third pulse is slightly out of phase with the corresponding line voltage half-wave and thus the transistor 24 will not be turned "on" for the entire duration of the voltage half-wave, and a leading portion of the latter will be "clipped" as shown in FIG. 2(c) so that when the transistor 24 is turned "off" the half-wave based "pulse" supplied to the vibrator will be shorter in duration than the previous pulses. It will be appreciated from FIG. 2(c) that the durations of these "pulses" will continue to decrease as the shift in time between the half-wave line "pulses" and the signal generator pulses increases and when the two are directly out of phase as shown at the right hand portion of FIGS. 2(a) and 2(b), transistor 24 will be switched "off" during the occurrence of the corresponding line pulse and no pulse will be applied to the vibrator 18 at this time. Thus, if the pulse width of the control pulses is chosen to be equal to or greater than the duration of the A.C. half-wave "pulses" some of the A.C. half-wave "pulses" will be blocked completely.

It will be seen from the foregoing that the signal supplied to the vibrator 18 comprises a plurality of pulses whose durations or widths gradually vary with time. This variation in the pulse width has the effect, inter alia, of varying the maximum intensity of the vibration produced by the vibrator 18. Although the use of a signal generator which produces a pulse train of variable period, with pulses of variable duration, provides an advantageous flexibility in controlling the frequency and intensity of the vibrations produced, either or both parameters can be fixed if it is desired, for example, to produce a specific vibration pattern which is not to be varied by the user. Further, it will be appreciated that other variations in the specific circuit illustrated, and described above, are possible within the scope and spirit of the invention, and, for example, a thyristor (e.g., an SCR or triac) can be used as an electronic switch in the place of transistor 24. Thus, while the invention has been described relative to a preferred embodiment thereof, it will be understood by those skilled in the art that variations and modifications can be effected in this preferred embodiment without departing from the scope and spirit of the invention.

We claim:

1. In combination, an article of furniture; an electromagnetic vibrator, including a driving coil, for inducing vibrations into the article of furniture; and a control circuit for controlling the driving current supplied to the driving coil of said electromagnetic vibrator; said control circuit comprising:

plug means connected to said electromagnetic vibrator and adapted to be connected to source of A.C. line voltage; and control means for controlling the duration of the portion of each cycle of the A.C. line voltage supplied to said electromagnetic vibrator, said control means comprising an electronic switch connected in series with the driving coil of said electromagnetic vibrator and a control pulse generating means for supplying control pulses to said electronic switch to control switching of said electronic switch in timed relationship with respect to the A.C. line voltage waveform so as to vary the duration of the portion of the A.C. line voltage supplied to the electromagnetic vibrator during each cycle of the A.C. line voltage.

2. The combination claimed in claim 1 further comprising rectifier means for half-wave rectifying said A.C. line voltage, said control means controlling the duration of the portion of each voltage half-wave supplied to the electromagnetic vibrator.

3. The combination claimed in claim 1 where said control pulse generator means comprises a signal generator for generating a train of constant duration pulses having a frequency which differs from the frequency of the line voltage such that switching of said electronic switch over a predetermined period occurs at a point in the A.C. half-wave which gradually varies in the same direction over the period so as to produce a corresponding gradual variation in the duration of the portion of the A.C. half-wave supplied to the electromagnetic vibrator.

4. The combination claimed in claim 3 wherein the duration of said control pulses is such as to completely block some of the voltage half-waves during said predetermined period.

5. The combination claimed in claim 1 wherein said electronic switch comprises a transistor.

6. The combination claimed in claim 1 wherein said electronic switch comprises a thyristor.

7. The combination claimed in claim 3 further comprising timing means for controlling enabling and disabling of said signal generator.

8. The combination claimed in claim 1 wherein the duration of said control pulses is variable.

9. The combination claimed in claim 1 wherein the period of said control pulses is variable.

10. The combination claimed in claim 1 wherein the duration and period of said control pulses are variable.

11. The combination claimed in claim 2 wherein the duration of the control pulses is constant and is substantially equal to the duration of the rectified A.C. voltage half-waves.

12. A vibrator system for inducing vibrations in a body, said system comprising:

an electro-mechanical vibrator, for producing vibrations in the body;

means adapted to be connected to a source of A.C. line voltage for supplying A.C. line voltage to electro-mechanical vibrator; and control means for controlling the duration of the portion of the A.C. line voltage supplied to the electro-mechanical vibrator during each cycle of the A.C. line voltage, said control means comprising an electronic switch which switches between an "on" state during which the A.C. line voltage is supplied to the electro-mechanical vibrator and an "off" state wherein the A.C. voltage is prevented from being supplied to the electro-mechanical vibrator, and signal generator means for variably controlling the time during which said electronic switch switches to the "on" state thereof so as to gradually vary the duration of the portion of the A.C. line voltage supplied to the electro-mechanical vibrator during each cycle, over a given time period, between a predetermined maximum duration and a predetermined minimum duration.

13. A system as claimed in claim 12 wherein said signal generator produces variable duration pulses for controlling switching of said electronic switch.

14. A system as claimed in claim 12 wherein said signal generator produces control pulses whose relationship in time with respect to the A.C. line voltage controls the A.C. line voltage supplied to the vibrator.

15. A system as claimed in claim 14 wherein said signal generator produces control pulses of constant, adjustable duration for controlling switching of said electronic switch.

16. A system as claimed in claim 15 wherein said signal generator produces variable period pulse train of variable duration control pulses for controlling switching of said electronic switch.

17. In combination, an article of furniture; an electromagnetic vibrator, including a driving coil, for inducing vibrations into the article of furniture; and a control circuit for controlling the driving current supplied to the driving coil of said electromagnetic vibrator; said control circuit comprising:

means connected to said electromagnetic vibrator and adapted to be connected to source of A.C. line voltage;

rectifier means for half-wave rectifying said A.C. line voltage; and control means for controlling the duration of the portion of each cycle of the A.C. line voltage supplied to said electromagnetic vibrator, said control means comprising an electronic switch connected in series with the driving coil of said electromagnetic vibrator and a variable duration, variable period pulse generator means for generating a train of constant duration pulses for controlling switching of said electronic switch, the frequency of said pulses differing from the frequency of the line voltage such that switching of said electronic switch over a predetermined period occurs at a point in the A.C. half-wave which gradually varies in the same direction over the period so as to produce a corresponding gradual variation in the duration of the portion of the A.C. half-wave supplied to the electromagnetic vibrator.

* * * * *